United States Patent
Manhart

(10) Patent No.: US 12,541,905 B2
(45) Date of Patent: Feb. 3, 2026

(54) METHOD FOR GENERATING A VIRTUAL MASK IMAGE AND ANGIOGRAPHY APPARATUS

(71) Applicant: Siemens Healthcare GmbH, Erlangen (DE)

(72) Inventor: Michael Manhart, Fürth (DE)

(73) Assignee: Siemens Healthineers AG, Forchheim (DE)

( * ) Notice: Subject to any disclaimer, the term of this patent is extended or adjusted under 35 U.S.C. 154(b) by 180 days.

(21) Appl. No.: 18/369,151

(22) Filed: Sep. 16, 2023

(65) Prior Publication Data

US 2024/0095991 A1 Mar. 21, 2024

(30) Foreign Application Priority Data

Sep. 20, 2022 (DE) .................... 10 2022 209 890.0

(51) Int. Cl.
*G06T 15/00* (2011.01)
*A61B 6/00* (2024.01)
*A61B 6/50* (2024.01)
*G06T 5/50* (2006.01)

(52) U.S. Cl.
CPC .............. *G06T 15/00* (2013.01); *A61B 6/504* (2013.01); *G06T 5/50* (2013.01); *G06T 2207/20221* (2013.01); *G06T 2207/20224* (2013.01)

(58) Field of Classification Search
CPC . G06T 15/00; G06T 5/50; G06T 2207/20221; G06T 2207/20224; A61B 6/504; A61B 6/486; A61B 6/507; A61B 6/5241; A61B 6/4441
See application file for complete search history.

(56) References Cited

U.S. PATENT DOCUMENTS

| 4,720,843 | A | 1/1988 | Haaker | |
|---|---|---|---|---|
| 8,509,384 | B2 * | 8/2013 | Spahn | A61B 6/4458 378/98.12 |
| 10,198,800 | B2 | 2/2019 | Manhart | |
| 10,755,455 | B1 * | 8/2020 | Kaethner | G06T 11/008 |
| 10,874,367 | B2 * | 12/2020 | Hao | A61B 6/481 |
| 11,455,711 | B2 * | 9/2022 | Manhart | A61B 6/5205 |
| 12,039,703 | B2 * | 7/2024 | Manhart | G06T 7/0016 |
| 12,229,924 | B2 * | 2/2025 | Manhart | G06T 7/0016 |
| 2011/0038458 | A1 | 2/2011 | Spahn | |
| 2013/0112874 | A1 | 5/2013 | Osvath | |

(Continued)

FOREIGN PATENT DOCUMENTS

| DE | 102009037243 A1 | 2/2011 |
|---|---|---|
| DE | 102015224806 B4 | 1/2018 |

(Continued)

*Primary Examiner* — Vijay Shankar
(74) *Attorney, Agent, or Firm* — Lempia Summerfield Katz LLC

(57) ABSTRACT

The disclosure provides solutions for reducing exposure to radiation in digital subtraction angiography. For this, a method for generating a virtual mask image is proposed. A plurality of images of an object is captured by an angiography apparatus. For at least some of all pixel positions, an extreme pixel value of the pixels of the plurality of images in the respective pixel position is respectively ascertained. The virtual mask image is created from the extreme pixel values at the respective pixel positions.

18 Claims, 2 Drawing Sheets

(56) References Cited

U.S. PATENT DOCUMENTS

2019/0365340 A1\* 12/2019 Hao .......................... G06T 5/50
2023/0037260 A1    2/2023 Manhart

FOREIGN PATENT DOCUMENTS

DE    102021208272 A1    2/2023
EP         0200262 B1    3/1993
EP         2628146 A2    8/2013

\* cited by examiner

METHOD FOR GENERATING A VIRTUAL MASK IMAGE AND ANGIOGRAPHY APPARATUS

The present patent document claims the benefit of German Patent Application No. 10 2022 209 890.0, filed Sep. 20, 2022, which is hereby incorporated by reference in its entirety.

TECHNICAL FIELD

The present disclosure relates to a method for generating a virtual mask image for digital subtraction angiography. The present disclosure also relates to an angiography apparatus for generating such a virtual mask image. Furthermore, the present disclosure relates to a corresponding computer program and to a computer-readable storage medium.

BACKGROUND

Digital subtraction angiography (DSA) is a procedure known from the prior art for visualizing or representing structures in regions of the body of a person by diagnostic imaging methods, for example, radiography. Such structures to be visualized may be blood vessels in the region of the body. Customarily, a plurality of chronological images of the region of the body to be examined is created in digital subtraction angiography by an angiography apparatus, for example, an X-ray device. A contrast agent is injected into the vessel during this sequence of recordings, and this makes the vessel more visible, and it is mapped in the images that are recorded. What is known as an empty image may be recorded before the injection of the contrast agent, and this shows structures of the region of the body, (e.g., bones), which are different from the blood vessels. This empty image is what is known as a mask image, by which the interfering structures, different from the blood vessels, may be masked out in the images recorded with the contrast agent in the blood vessel, what are known as fill images. For this, the mask image is customarily subtracted from the fill images. The subtraction images resulting therefrom may still only show the blood vessels filled with the contrast agent. On the basis of a course over time of the contrast agent in the blood vessels, which may be determined on the basis of the sequence of subtraction images generated from the fill images and the mask image, it is possible to make statements about a condition of the blood vessel and, for example, vascular occlusions or constrictions, cerebral aneurysms, or arteriovenous abnormalities (arteriovenous malformations, AVM) may be identified.

A DSA sequence may be carried out with a radiation dose of 1.2 µGray/frame at seven and a half frames per second (fps) with a duration of about ten seconds. This results in an overall radiation dose of 90 µGray. Since the radiation used for imaging may be harmful to people, (e.g., to patients, technicians, and medical professionals who are working on or with the angiography apparatus), it is desirable to keep the radiation dose as low as possible in order to thereby reduce the exposure of the people to radiation. Low dose DSA methods are known from the prior art for this. One problem in this case is that the reduced radiation dose also impairs the quality of the images recorded, for example, in that the images recorded have a high level of image noise. The noisy images make it difficult to make a statement about the condition of the blood vessels.

As illustrated above, digital subtraction angiography is based on the subtraction of a mask image from fill images in order to represent contrasted vessels. The acquisition of mask images requires an additional (X-ray) dose, however. In addition, artifacts in the subtraction images may result due to patient movement between mask image and fill image.

From document EP 2 628 146 B1, digital variance angiography (DVA) is known, which enables the representation of vascular images without mask images by calculating the variance over time in the measurements at the individual detector pixels. The method for mapping an object of interest by penetrating radiation includes positioning a source of the penetrating radiation and a radiation detector outside of the object of interest with the object of interest therebetween. In addition, a large number of measurements of the penetrating radiation is provided by the object of interest for all straight-line paths through the object. The large number of measurements for all straight-line paths is processed to obtain a statistical parameter, which is capable of describing a breadth of a distribution over time of the large number of measurements for all paths. The image of the object of interest is reconstructed on the basis of the statistical parameter, which describes the distribution of the large number of measurements. One drawback of this method includes that only a single overall image of the vessels is generated and a representation over time of contrast agent filling is not directly possible.

Document DE 10 2015 224 806 B4 proposes a method for generating a noise-reduced mask image by weighted averaging of all images (mask and fill) of a DSA series. The weights are determined pixel-wise in accordance with the similarity to a reference mask image.

SUMMARY AND DESCRIPTION

The object of the present disclosure includes further reducing the exposure to radiation during subtraction angiography and optionally enabling a representation over time of contrast agent filling operations.

The object is achieved by a method and an angiography apparatus as described herein. The scope of the present disclosure is defined solely by the appended claims and is not affected to any degree by the statements within this summary. The present embodiments may obviate one or more of the drawbacks or limitations in the related art.

Accordingly, a method for generating a virtual mask image for a digital subtraction angiography is provided. An actual mask image is therefore not recorded and generated and instead a virtual mask image is obtained from other images, in particular from fill images, and the virtual mask image artificially created or calculated therefrom. In this way no separate radiation dose is required for recording an actual mask image.

A plurality of images of an object is captured in a first act by an angiography apparatus. A sequence or time series of images, (e.g., time-resolved mappings), of the object may thus be obtained, as is customary in angiography. The images may be obtained from a patient after injection of a contrast agent. It is therefore not necessary to make absolutely sure that a mask image is acquired before contrast agent is administered. Instead, the process may begin immediately with a customary fill image sequence.

In a further act, an extreme pixel value (for example, maximum pixel intensity with iodine as the contrast agent or minimum pixel intensity with $CO_2$ as the contrast agent) of the pixels of the plurality of images is ascertained in the respective pixel position for at least some of all pixel positions, in particular for all pixel positions, of the images.

At least two captured images (e.g., all of the captured images) are examined pixel for pixel with regard to their raw pixel values. For example, maximum or minimum pixel values over the at least two images, (e.g., all images) are thus ascertained for at least some of the pixel positions, (e.g., all pixel positions), (x, y). By way of example, the maximum value is ascertained for the pixel position (1,1) as an extreme value of all raw pixel values, a mean of a predefined number of maximum raw pixel values, a median of a predefined number of maximum raw pixel values as the extreme value, or the like at the position (1,1) of all images. The same process is carried out for the remaining pixel positions.

In a further act, the virtual mask image may thus be created from the extreme pixel values at the respective pixel positions. At each pixel position, the virtual mask image consequently has a respective absolute or statistically formed minimum or maximum value of some or all pixel values of all images at this respective pixel position. The virtual mask image results thereby without additional exposure to radiation resulting for the object to be examined, in particular a patient. Although no separate mask image was obtained, unlike in digital variance angiography the contrast agent filling over time may also be represented since the virtual mask image, which may be subtracted from the individual fill images, is indeed available.

The respective extreme pixel value represents a maximum intensity (ascertained absolute or statistically, for example averaged, from raw pixel values), which (without movement of the object or of the patient) may be attained at this pixel. In particular, this may correspond to a minimum optical density at the respective pixel. That is to say, the minimum radiation attenuation is sought for each pixel position. This means that the ascertained radiation attenuation due to corresponding structures is present in any event at the respective pixel position and these structure-based attenuations are to be subtracted from fill images to be able to make contrast agent-based changes more visible.

As has already been indicated above, all of the plurality of images are fill images. Even if an administration of contrast agent is not visible in each image, these are already fill images if the contrast agent has been administered. It is therefore not necessary to specifically provide that a mask image is recorded before the administration of contrast agent.

According to a further exemplary embodiment, it is provided that a noise-reduced virtual mask image is obtained in that at least two (e.g., optionally all) of the plurality of images, including the virtual mask image, are added together so as to be weighted pixel-wise. This means that when forming the noise-reduced virtual mask image the pixels of the at least two, in particular all, images are weighted singly and those pixels with the extreme pixel value are weighted twice. The virtual mask image is therefore already given a particular weight during this summation and optionally formation of the mean.

In a development of the act for obtaining the noise-reduced virtual mask image, weights for the summation may be obtained as a function of a similarity of the respective pixel value to a corresponding pixel value of the virtual mask image. In particular, it is thus possible to give more weight to those pixel values which are located closer to the pixel value of the virtual mask image. The virtual mask image may be additionally weighted in this way. The virtual mask image may be used as a reference mask image for determination of the similarity of the pixel values.

In a further exemplary embodiment, it is provided that a temporal maximum value per pixel is determined as the extreme pixel value. The pixel values may change dynamically in the image sequence on administration of contrast agent or due to other effects, so each pixel value corresponds to a snapshot. With customary contrast agents, the maximum value over time per pixel position is then sought.

A method for obtaining a static vessel image by generating a virtual mask image, as has been described above, obtaining a plurality of subtraction images from the plurality of images by subtracting the virtual mask image respectively, and for at least some of all pixel positions of the images, weighted summation of the respective pixel values of all subtraction images may thus also be provided. This means that the generated virtual mask image is used to obtain subtraction images from the plurality of (e.g., fill) images, and these may be added together so as to be weighted depending on position in relation to each pixel position. A static vascular image is thereby produced from a large number of subtraction images. The subtraction images from different contrast agent concentration conditions may thus be combined to form an overarching vascular image.

Specifically, the weights for the summation may be selected to be all the higher, the higher the respective pixel value is. The signal-to-noise ratio may be significantly improved in this way.

Furthermore, a method for obtaining an angiographic image sequence for a representation over time of contrast agent filling in a vessel structure by generating a virtual mask image, as has been described above, and generating the angiographic image sequence by subtracting the virtual mask image from each of the plurality of images may be provided. The angiographic image sequence shows how the contrast agent filling changes in the individual vessels over time. Since the virtual mask is also formed from these images, corresponding subtraction images may thus be provided directly for all individual images of the angiographic image sequence. A subtraction image sequence for the representation over time of the contrast agent filling may thus be made available even without explicitly recording a mask image.

The above-mentioned object is also achieved by an angiography apparatus for generating a virtual mask image for digital subtraction angiography. The apparatus includes a capture facility for capturing a plurality of images of an object. The apparatus further includes processing facility that, for at least some of all pixel positions of the images, is configured to ascertain an extreme pixel value of the pixels of the plurality of images in the respective pixel position and to create the virtual mask image from the extreme pixel values at the respective pixel positions.

The capture facility may be an X-ray facility, such as a C-arm. The processing facility may be an image processing facility, which is based on a computer.

The developments and advantages depicted above in conjunction with the method also apply analogously to the angiography apparatus. The individual method acts may be implemented as functional features of the angiography apparatus.

The present disclosure may assume the form of a computer program product that includes program modules that may be accessed by a computer-usable or computer-readable medium, which stores program code for use by or in connection with one or more computer(s), processor(s), or command execution systems. For the purpose of this description, a computer-usable or computer-readable medium may be any device, which may contain, store, communicate, process, or transport the program for use by or in connection with the command execution system, the device, or the apparatus. The medium may actually be an electronic, magnetic, optical, electromagnetic, infrared, or semiconductor system (or a device or an apparatus) or a transfer medium since signal carriers are not included in the definition of the physical computer-readable medium, including a semiconductor or solid state storage, a magnetic tape, an exchangeable computer disk, a random access memory (RAM), a read-only memory (ROM), a rigid magnetic disk, and an optical disk, such as compact disk read-only memory (CD-ROM), compact disk with read/write function and DVD. The processors and the program code for implementing the individual aspects of the technology may be centralized or distributed (or a combination thereof), as is known to a person skilled in the art.

While the present disclosure has been described in detail with reference to specific embodiments, the present disclosure is not limited to these embodiments. In view of the present disclosure, many modifications and variations are obvious to experts in the field without departing from the protective scope of the present disclosure, as it is described here. The scope of the present disclosure is therefore given by the following claims rather than by the preceding description. All changes, modifications, and variations, which fall in the realms of meaning and equivalence of the claims, may be taken into account in the field of application thereof. All advantageous embodiments, which are claimed in the method claims, may also be analogously transferred to the system/device claims.

For specific applications or application situations, which may arise with the method, and which are not explicitly described here, it may be provided that an error message and/or a request to input a user acknowledgement is output and/or a standard setting and/or a predetermined initial state is set according to the method.

BRIEF DESCRIPTION OF THE DRAWINGS

The present disclosure is explained in more detail on the basis of the accompanying drawings, in which.

DETAILED DESCRIPTION

Figure 1:
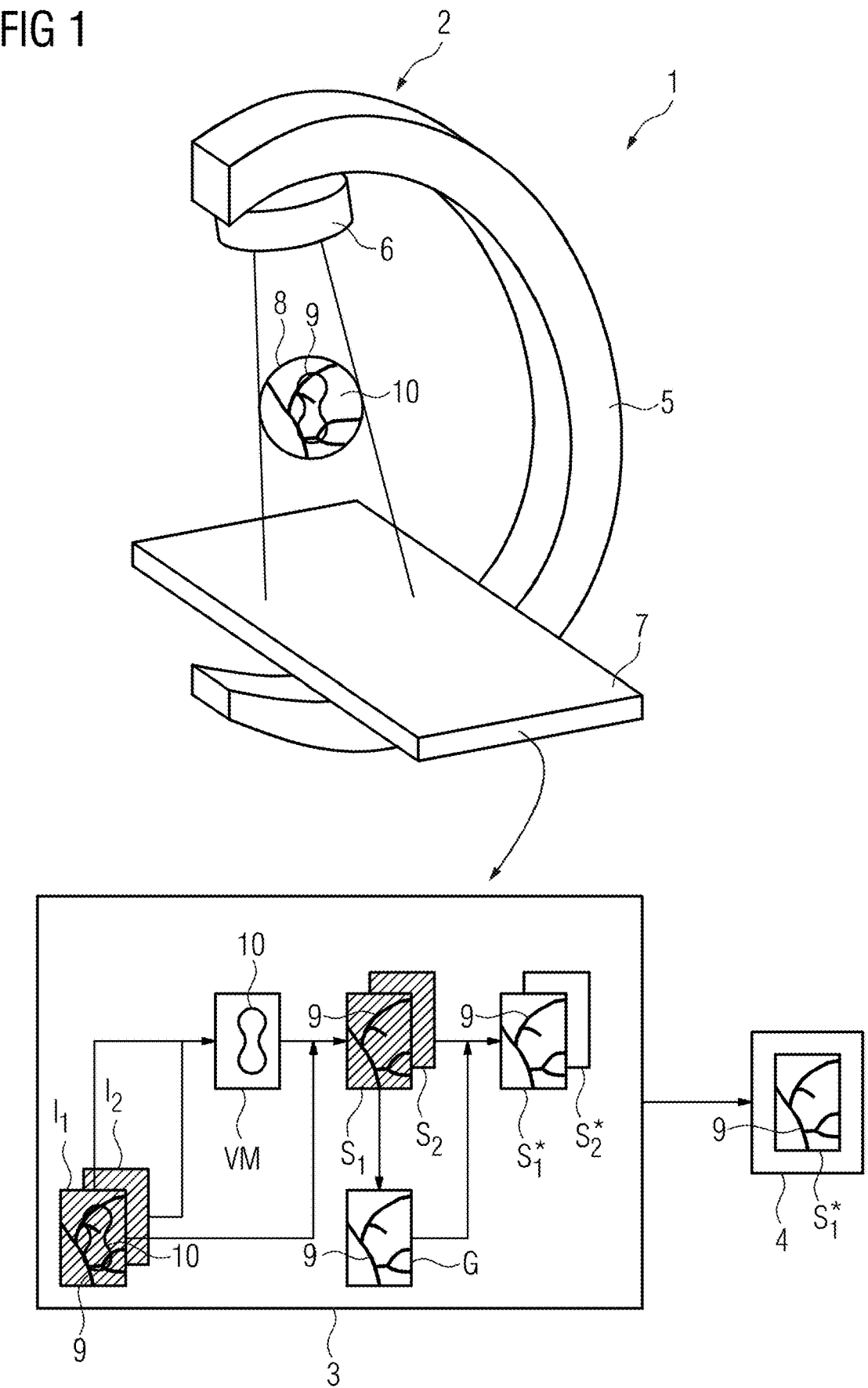
FIG. 1 depicts a schematic representation of an embodiment of an angiography apparatus.

FIG. 1 shows an embodiment of an angiography apparatus 1. The angiography apparatus 1 has a capture facility 2, a processing facility 3, and a display facility 4. The capture facility 2 is configured for generating images and may be an X-ray apparatus, which may have a C-arm 5. An X-ray source 6 for emitting X-ray radiation may be mounted at one end of the C-arm 5. An X-ray detector 7 for capturing the X-ray radiation emitted by the X-ray source 6 may be mounted at an opposing end of the C-arm 5. The processing facility 3, which is configured for processing the images generated by the capture facility 2, may include a processor facility, such as a digital computer or a computer. The display facility 4 may include a screen that displays images processed by the processing facility 3.

A region of the body 8, (e.g., the head of a patient), may be examined by the angiography apparatus 1. In particular, blood vessels may be examined as a first structure 9 in the region of the body 8. There is, in particular, also a second structure 10, (e.g., bone material), present in the region of the body 8 of the patient. In order to examine the region of the body 8, the capture facility 2 creates or generates a sequence of recordings with images $I_t$ recorded chronologically, of which two images $I_1$ and $I_2$ are shown here. During the sequence of recordings, a contrast agent is injected into the first structure 9 of the region of the body 8, the spread of which may be examined over time in the first structure 9. For example, conclusions about the condition of the blood vessels of the region of the body 8 may be drawn on the basis of the course over time of a concentration of the contrast agent. For example, vascular constrictions and vascular occlusions may be identified.

The capture facility 2 does not generate what is known as an empty image, which is recorded in customary methods according to the prior art without the contrast agent in the first structure 9. Instead, the capture facility 2 chronologically records only what are known as fill images $I_1, I_2, \ldots$ (for the sake of clarity, FIG. 1 represents only two fill images, which will hereinafter be representatively referred to as "$I_1$ and $I_2$"), which show the first structure 9 in the case of different contrast agent concentrations, and the second structure 10. For example, the first fill image $I_1$ shows the first structure 9 in the case of a first contrast agent concentration and the second fill image $I_2$ recorded after the first fill image $I_1$ shows the first structure 9 in the case of a second contrast agent concentration. The images $I_1$ and $I_2$ are optionally recorded with a particularly low radiation dose, (e.g., 0.8 μGray/frame), whereby the images $I_1$ and $I_2$ have a high level of image noise. This is visualized in FIG. 1 by the hatching in the images $I_1$ and $I_2$.

Figure 2:
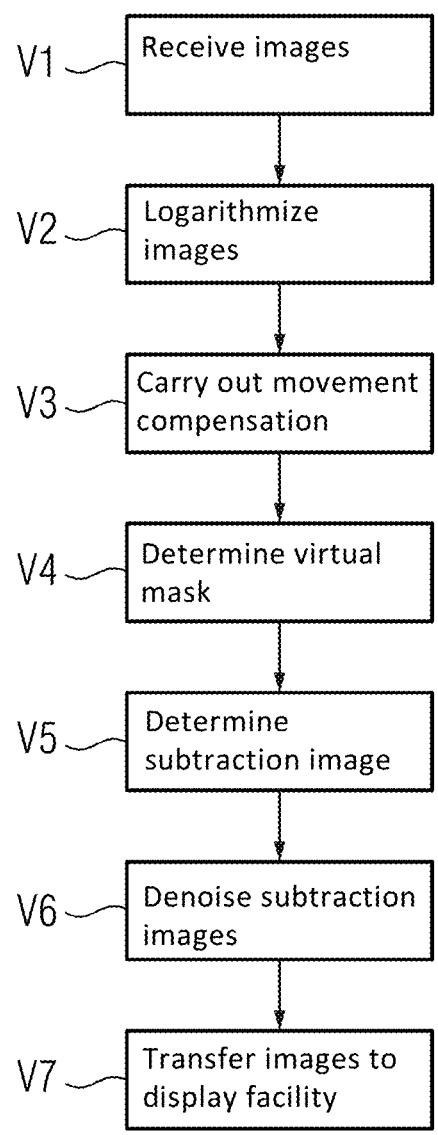
FIG. 2 depicts a schematic representation of a flowchart of an embodiment of a method.

The processing facility 3 is provided with the images $I_1$ and $I_2$ recorded by the capture facility 2. The images $I_1$ and $I_2$ are received in method act V1 of a method, which is represented by the flowchart in FIG. 2.

In method act V2, the images $I_1$ and $I_2$ may be logarithmized.

In method act V3, a movement compensation may be carried out in the images $I_1$ and $I_2$. This means that a displacement of the recorded region of the body 8, and therewith of the structures 9, 10, is corrected in the images $I_1$ and $I_2$, which is caused by a movement of the region of the body 8 when the sequence of images is being recorded.

In method act V4, what is known as a virtual mask image VM is determined, which shows only the second structure 10. The virtual mask image VM is determined from the fill images $I_1$ and $I_2$.

Instead of estimating a statistical parameter as in digital variance angiography, a virtual mask image is therefore generated. It is consequently possible to refer to virtual mask angiography. Since an actual mask image is thus available, in contrast to digital variance angiography this opens up the possibility of also representing the contrast agent filling in terms of time.

To be able to dispense with explicitly recording a mask image, first of all a virtual mask image VM is calculated from the plurality of images or fill images $I_1$ and $I_2$ (only two are symbolically represented in FIG. 1). This may take place, for example, by way of a pixel-wise, temporal minimum, or maximum intensity projection. This means that the minimum or maximum pixel value is sought from all images for each pixel position. Since the contrast agent attenuates the measured intensity, a value with no or minimal increase in contrast is thus determined for each pixel. For example, the brightest pixel or the pixel with minimal optical density is therefore sought. This results in optimally every input of contrast agent being deducted from the virtual mask image.

Other methods may also be used for calculating the virtual mask image. By way of example, an average value of the brightest or darkest three pixels (optionally also any other number) may be used as the minimum or maximum pixel value for one pixel position. The highest/lowest raw pixel values are therefore averaged to form the maximum/minimum pixel value. A further increase in the signal-to-noise ratio may optionally be achieved thereby.

Alternatively, it may also be beneficial for the virtual mask image to use a median of a particular number of lightest/darkest pixels (e.g., highest raw pixel values) respectively as the maximum/minimum pixel value per pixel position. This may also have a positive effect on the signal-to-noise ratio.

Alternatively, for determining the virtual mask, a neural network may also be trained from time series of captured images of an object in order, for example, to obtain improved noise behavior or to take better account of an environment.

Since the images $I_1$ and $I_2$ are noisy, a noise-reduced mask image M may be determined in that a respective weighted sum of the image element values $I_t(x, y)$ of the image sequence is calculated as the image element values $M(x, y)$ of the mask image M:

$$M(x, y) = \sum_{t=0}^{T} w_t(x, y) I_t(x, y)$$

In this case, the image $I_t$ corresponds to the image at location t in the image sequence, which includes t=0 . . . T images. The image $I_0$ corresponds to the virtual mask image VM. The images $I_1$, $I_2$, etc. correspond to the fill images actually recorded. $w_t(x, y)$ describes a weighting value with which the image element value $I_t(x, y)$ of the image $I_t$ is weighted, and which is dependent on the color difference of the image element value $I_t(x, y)$ from the image element value $I_0(x, y)$ of the virtual mask VM. The weighting function $w_t$ may be specified as the following formula:

$$w_t(x, y) = e^{-0.5(I_t(x,y)-I_0(x,y))^2/\sigma^2} / \sum_{t'=0}^{T} e^{-0.5(I_{t'}(x,y)-I_0(x,y))^2/\sigma^2}$$

In this case, $\sigma^2$ corresponds to the estimated average noise energy in the case of $I_t-I_0$. Since the noise level is signal-dependent, an image element-dependent or pixel-dependent noise energy $\sigma(x, y)$ may also be predefined.

In method act V5, subtraction images $S_t$ are determined, of which two subtraction images $S_1$, $S_2$ are represented here, and which show the first structure 9 in the case of different contrast agent concentrations. The subtraction images $S_1$, $S_2$ correspond to the fill images $I_1$ and $I_2$, from which the second structure 10 was masked out by the virtual mask image VM or the noise-reduced virtual mask image M. For this, the mask image VM or M (by way of example the mask image M in the following formula) is subtracted from the fill images $I_1$, $I_2$:

$$S_t(x,y) = I_t(x,y) - M(x,y)$$

wherein a subtraction image $S_t$ corresponds to the image at location t in the sequence of recordings that has t=1 . . . T subtraction images.

Optionally, the subtraction images $S_t$ are locally and/or temporally denoised in a known manner in a sixth method act V6 to form noise-reduced subtraction images $S^*_t$. The subtraction images $S_t$ or noise-reduced subtraction images $S^*_t$ may be transferred by the evaluation facility in a seventh method act V7 to the display facility 4 for visual representation.

To obtain a static image of the vessel structure as in the case of digital variance angiography, a weighted pixel-wise summation of the subtracted individual images may take place. Pixel values with a higher signal may be weighted higher in order to improve the signal-to-noise ratio.

Experiments have shown that vessel images may be generated in a manner very similar to digital variance angiography. In addition, the time-resolved series may be calculated.

As the exemplary embodiments cited above show, no statistical parameters are used to obtain a vascular image from non-subtracted series. Furthermore, time-resolved digital subtraction angiography is advantageously directly possible.

It is to be understood that the elements and features recited in the appended claims may be combined in different ways to produce new claims that likewise fall within the scope of the present disclosure. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. An angiography apparatus for generating a virtual mask image for digital subtraction angiography, the angiography apparatus comprising:
   a capture facility configured to capture a plurality of images of an object; and
   a processing facility that, for at least some pixel positions of all pixel positions of the plurality of images, is configured to:
      ascertain an extreme pixel value of pixels of the plurality of images in a respective pixel position; and
      create the virtual mask image from the extreme pixel values at the respective pixel positions.

2. A non-transitory computer-readable storage medium, comprising a computer program having commands, which, when the commands are executed by a computer, cause the computer to:
   capture a plurality of images of an object by an angiography apparatus;
   ascertain, for at least some pixel positions within the plurality of images, an extreme pixel value of pixels of the plurality of images in a respective pixel position; and
   create a virtual mask image from the extreme pixel values at the respective pixel positions.

3. A method for generating a virtual mask image for digital subtraction angiography, the method comprising:
   capturing a plurality of images of an object by an angiography apparatus;
   ascertaining, for at least some pixel positions within the plurality of images, an extreme pixel value of pixels of the plurality of images in a respective pixel position; and
   creating the virtual mask image from the extreme pixel values at the respective pixel positions.

4. The method of claim 3, wherein each image of the plurality of images is a fill image.

5. The method of claim 4, further comprising:
obtaining a noise-reduced virtual mask image, wherein at least two images of the plurality of images including the virtual mask image are added together so as to be weighted pixel-wise.

6. The method of claim 5, further comprising:
obtaining weights for a summation of the at least two images as a function of a similarity of a respective pixel value to a corresponding pixel value of the virtual mask image.

7. The method of claim 6, further comprising:
obtaining a static vessel image by:
 obtaining a plurality of subtraction images from the plurality of images by subtracting the virtual mask image respectively; and
 conducting a weighted summation of respective pixel values of all subtraction images for the at least some pixel positions within the plurality of images.

8. The method of claim 7, wherein weights for the weighted summation are selected such that pixel values with a higher signal value are weighted higher than pixel values with a lower signal value.

9. The method of claim 6, further comprising:
generating an angiographic image sequence for a representation over time of a contrast agent filling in a vessel structure by subtracting the virtual mask image from each image of the plurality of images.

10. The method of claim 3, further comprising:
obtaining a noise-reduced virtual mask image, wherein at least two images of the plurality of images including the virtual mask image are added together so as to be weighted pixel-wise.

11. The method of claim 10, further comprising:
obtaining weights for a summation of the at least two images as a function of a similarity of a respective pixel value to a corresponding pixel value of the virtual mask image.

12. The method of claim 3, wherein a temporal maximum value per pixel is ascertained as the extreme pixel value.

13. The method of claim 3, further comprising:
obtaining a static vessel image by:
 obtaining a plurality of subtraction images from the plurality of images by subtracting the virtual mask image respectively; and
 conducting a weighted summation of respective pixel values of all subtraction images for the at least some pixel positions within the plurality of images.

14. The method of claim 13, wherein weights for the weighted summation are selected such that pixel values with a higher signal value are weighted higher than pixel values with a lower signal value.

15. The method of claim 3, further comprising:
generating an angiographic image sequence for a representation over time of a contrast agent filling in a vessel structure by subtracting the virtual mask image from each image of the plurality of images.

16. The method of claim 3, wherein the extreme pixel value is a maximum pixel intensity or a minimum pixel intensity for the respective pixel position of the at least some pixel positions within the plurality of images.

17. The method of claim 16, wherein the extreme pixel value is the maximum pixel intensity with iodine as a contrast agent.

18. The method of claim 16, wherein the extreme pixel value is the minimum pixel intensity with carbon dioxide as a contrast agent.

* * * * *